(12) United States Patent
Clomburg, Jr. et al.

(10) Patent No.: US 7,846,413 B2
(45) Date of Patent: Dec. 7, 2010

(54) SYSTEMS AND PROCESSES FOR PRODUCING HYDROGEN AND CARBON DIOXIDE

(75) Inventors: Lloyd Anthony Clomburg, Jr., Houston, TX (US); Andreas Nicholas Matzakos, Missouri City, TX (US); Peter Veenstra, Amsterdam (NL); Scott Lee Wellington, Bellaire, TX (US)

(73) Assignee: Shell Oil Company, Houston, TX (US)

( * ) Notice: Subject to any disclaimer, the term of this patent is extended or adjusted under 35 U.S.C. 154(b) by 452 days.

(21) Appl. No.: 11/946,747

(22) Filed: Nov. 28, 2007

(65) Prior Publication Data

US 2008/0179569 A1 Jul. 31, 2008

Related U.S. Application Data

(60) Provisional application No. 60/868,037, filed on Nov. 30, 2006.

(51) Int. Cl.
*C01B 31/20* (2006.01)
*C01B 3/24* (2006.01)
*C01B 3/26* (2006.01)
*C01B 3/16* (2006.01)

(52) U.S. Cl. .................. 423/437.1; 423/652; 423/653; 423/654; 423/655; 423/656

(58) Field of Classification Search ............. 423/437.1, 423/652, 653, 654, 655, 656
See application file for complete search history.

(56) References Cited

U.S. PATENT DOCUMENTS

| | | | | |
|---|---|---|---|---|
| 1,174,631 A | 3/1916 | Snelling | | |
| 2,773,561 A | 12/1956 | Hunter | | 183/115 |
| 3,251,652 A | 5/1966 | Pfefferle | | 23/213 |
| 5,300,275 A * | 4/1994 | Lywood | | 423/655 |
| 5,714,132 A * | 2/1998 | Kapoor et al. | | 423/418.2 |
| 6,090,312 A | 7/2000 | Ziaka et al. | | 252/373 |
| 6,589,303 B1* | 7/2003 | Lokhandwala et al. | | 48/197 FM |
| 6,919,062 B1* | 7/2005 | Vasileiadis et al. | | 423/437.1 |
| 7,025,940 B2 | 4/2006 | Shah et al. | | 422/198 |
| 7,255,845 B2* | 8/2007 | Tonkovich et al. | | 423/437.2 |
| 7,544,346 B2* | 6/2009 | Krause et al. | | 423/650 |
| 2001/0049906 A1* | 12/2001 | Shimazu | | 48/76 |
| 2002/0098132 A1 | 7/2002 | Vidalin | | 422/188 |
| 2003/0068269 A1 | 4/2003 | Matzakos et al. | | 423/652 |
| 2004/0163313 A1 | 8/2004 | Buxbaum | | 48/214 R |
| 2004/0244590 A1 | 12/2004 | Ma et al. | | 96/11 |
| 2007/0123595 A1* | 5/2007 | Lowe et al. | | 518/726 |
| 2010/0015039 A1* | 1/2010 | Doshi et al. | | 423/652 |

FOREIGN PATENT DOCUMENTS

| | | |
|---|---|---|
| EP | 1219566 | 7/2002 |
| EP | 1582502 | 10/2005 |
| EP | 1829821 | 9/2007 |
| WO | WO9930806 | 6/1999 |

* cited by examiner

*Primary Examiner*—Wayne Langel

(57) ABSTRACT

A process and a system are provided for producing and separating hydrogen and carbon dioxide from a hydrocarbon and steam. A hydrocarbon and steam are steam reformed and the reformed gas is shift reacted to produce a shift gas. Hydrogen is removed from the shift gas, and the hydrogen-depleted gas is reformed and shift reacted again to produce more hydrogen and carbon dioxide. The hydrogen and carbon dioxide are then separated.

16 Claims, 2 Drawing Sheets

SYSTEMS AND PROCESSES FOR PRODUCING HYDROGEN AND CARBON DIOXIDE

This application claims the benefit of U.S. Provisional Application No. 60/868,037 filed Nov. 30, 2006, which is incorporated by reference.

FIELD OF THE INVENTION

The present invention relates to systems and processes for producing hydrogen and carbon dioxide from a hydrocarbon containing gas. In particular, the present invention relates to systems and a processes for efficiently reforming a hydrocarbon to produce purified hydrogen and carbon dioxide streams.

BACKGROUND OF THE INVENTION

Hydrogen is utilized extensively in industrial processes. For example, large quantities of hydrogen are utilized in the synthesis of ammonia, methanol, and the like; for hydrorefining and hydrotreating petroleum; for catalytic hydrogenation; for food hydrogenation; for metal annealing; for the formation of hydrogen peroxide; and in fuel cells for the generation of electricity. Carbon dioxide is also utilized significantly in industrial processes. For example, carbon dioxide may be injected into oil wells to enhance oil recovery; may be used to enhance coal bed treatments; may be used in molten carbonate fuel cells; and may be utilized in greenhouses.

There are numerous processes for producing hydrogen and carbon dioxide from hydrocarbons or carbonaceous materials. A first step may involve producing hydrogen and carbon monoxide. For example, a gaseous stream containing hydrogen and carbon monoxide may be produced by steam reforming hydrocarbon materials such as methane; reacting coke or coal with steam and air; or partially oxidizing hydrocarbons such as methane, kerosene or diesel to produce a gas stream containing hydrogen and carbon monoxide. In a second step, the gas streams containing hydrogen and carbon monoxide may be treated in a water gas shift reaction with steam to produce carbon dioxide and additional hydrogen.

One such process for producing hydrogen and carbon dioxide is disclosed in U.S. Patent Publication No. 2003/0068269. A feed stream of methane is both steam-reformed and water-gas shifted in a single reactor in the presence of a hydrogen-selective, hydrogen-permeable membrane. Hydrogen gas is selectively separated from the product stream by diffusion through the membrane, driving the equilibrium of both of the reactions towards product gases. The temperature of the reactor may be controlled to favor production of carbon dioxide together with hydrogen. For example, the reactor may be run at 500° C. to favor producing shift reaction products carbon dioxide and hydrogen, as opposed to producing steam reforming products carbon monoxide and hydrogen which occurs at higher temperatures. The reactor cannot be run efficiently at temperatures much lower than 500° C. since some steam reforming must occur to convert the hydrocarbon to hydrogen and carbon monoxide, and the reforming reaction is a high temperature reaction, typically run at 700 to 1100° C. The high reaction temperature conditions necessary to conduct the steam reforming reaction, however, are detrimental to the lifespan of the hydrogen-selective, hydrogen-permeable membrane since such temperatures are near the operational limit of such membranes. Further, the process may not provide highly efficient energy conversion of the hydrocarbons to hydrogen and carbon dioxide since the process may not convert most or substantially all of the hydrocarbons to hydrogen and carbon dioxide since the reactor must be run at temperatures that only inefficiently steam reform hydrocarbons in order to simultaneously conduct a shift reaction.

A process for producing a mixture of hydrogen and carbon dioxide from a hydrocarbon or carbonaceous feedstock is provided in U.S. Pat. No. 6,090,312. A hydrocarbon feed, including a feed derived by reacting carbon dioxide with steam, is steam-reformed and shift reacted in a reactor to produce a gas stream containing hydrogen and carbon dioxide along with carbon monoxide, steam and methane. The gas stream is cooled in a heat exchanger sufficiently to condense and remove the steam from the gas stream. Hydrogen and carbon dioxide are separated from the gas stream together by passing the gas stream over a membrane selectively permeable to carbon dioxide and hydrogen. The remainder of the gas stream (e.g., methane and carbon monoxide) is reheated and either recycled back into the reactor or passed to a second reactor for further steam-reformation and shift reaction to produce more hydrogen and carbon dioxide. The subsequently produced hydrogen and carbon dioxide are separated from the resultant gas stream together by a membrane selectively permeable to carbon dioxide and hydrogen. Although the residual hydrocarbon stream and carbon monoxide are recycled or further processed in the process, the process is inefficient for energy conversion of hydrocarbons to hydrogen and carbon dioxide since the competing steam reforming and shift reactions are conducted in the same reactor with no means within the reactor for driving the equilibrium of either reaction towards the production of hydrogen and carbon dioxide.

A process for separating hydrogen and carbon dioxide from a feed stream containing hydrogen and carbon monoxide is disclosed in U.S. Pat. No. 3,251,652. Gaseous mixtures containing hydrogen and carbon monoxide derived from hydrocarbon or carbonaceous feedstocks are contacted with a hydrogen-permeable diffusion membrane for the separation of a pure diffused hydrogen stream. The undiffused gases are then processed in a water-gas shift reactor to convert carbon monoxide to carbon dioxide and produce more hydrogen. The resultant gas product contains carbon dioxide, hydrogen, and, at the least, some carbon monoxide. The hydrogen may be separated from the other gases by contact with a second hydrogen-permeable diffusion membrane, or it may be recycled back into the shift reactor after removal of carbon dioxide by refrigeration. The process does not energy efficiently convert most or all hydrocarbons in a feed to hydrogen and carbon dioxide since any hydrocarbon that was not converted into hydrogen and carbon monoxide in producing the hydrogen and carbon monoxide feedstock remains unconverted throughout the process since the hydrocarbon is not reformed into hydrogen and carbon monoxide by the shift reactor.

It would be desirable to have a system and a process for efficiently converting most or substantially all of a hydrocarbon feedstock to hydrogen and carbon dioxide, thereby providing improved energy conversion of the hydrocarbon feedstock into hydrogen and carbon dioxide. It would also be desirable to provide a process and a system capable of achieving such efficient conversion where the process and system provide for separating hydrogen from a gas stream at a temperature below the temperatures required to steam reform a hydrocarbon.

SUMMARY OF THE INVENTION

In one aspect, the present invention is directed to a process, comprising:

(a) contacting steam, a hydrocarbon, and a reforming catalyst at a temperature of at least 550° C., said hydrocarbon being vaporizable at said temperature, to produce a first reformed gas containing hydrogen, carbon monoxide, steam and at least one vaporized hydrocarbon;

(b) cooling the first reformed gas to a temperature of from 200° C. to 500° C.;

(c) contacting the cooled first reformed gas with a water-gas shift catalyst to produce a first shift gas containing hydrogen, carbon dioxide, steam, and at least one vaporized hydrocarbon;

(d) separating hydrogen from the first shift gas to produce a first hydrogen gas stream and a hydrogen-depleted gas containing carbon dioxide, steam, and at least one vaporized hydrocarbon;

(e) contacting the hydrogen-depleted gas with a reforming catalyst at a temperature of at least 550° C. to produce a second reformed gas containing hydrogen, carbon monoxide, and steam;

(f) cooling the second reformed gas to a temperature of from 200° C. to 500° C.;

(g) contacting the cooled second reformed gas with a water-gas shift reaction catalyst to produce a second shift gas containing hydrogen and carbon dioxide;

(h) separating the second shift gas into a second hydrogen gas stream and a carbon dioxide stream.

In another aspect, the present invention is directed to a process, comprising:

separating hydrogen from a gas containing at least 30 mol % hydrogen, at least 5 mol % carbon dioxide, a hydrocarbon, carbon monoxide, and steam to provide a first hydrogen gas stream and a hydrogen-depleted gas containing carbon dioxide, steam, a hydrocarbon, and carbon monoxide;

contacting the hydrogen-depleted gas with a reforming catalyst at a temperature of at least 550° C. to produce a reformed gas containing hydrogen, carbon monoxide, and steam;

cooling the reformed gas to a temperature of from 200° C. to 500° C.;

contacting the cooled reformed gas with a water-gas shift reaction catalyst to produce a shift gas containing hydrogen and carbon dioxide;

separating the shift gas into a second hydrogen gas stream and a carbon dioxide stream.

In another aspect, the present invention is directed to a system, comprising a reforming reactor;
a heat exchanger;
a first-pass water-gas shift reactor; and
a hydrogen gas separation unit;
where (a) the reforming reactor has first and second feed inlets, first and second flow paths, first and second reforming product outlets, at least one reforming catalyst, and a heat source; where (1) the first feed inlet is in gas/fluid communication with the first flow path;

(2) the first flow path is in gas/fluid communication with at least one reforming catalyst and the first reforming product outlet, and is in heat transfer communication with the heat source;

(3) the second feed inlet is in gas/fluid communication with the second flow path; and (4) the second flow path is in gas/fluid communication with at least one reforming catalyst and the second reforming product outlet, and is in heat transfer communication with the heat source;

(b) the first reforming product outlet of the reforming reactor is in gas/fluid communication with the heat exchanger;

(c) the heat exchanger is in gas/fluid communication with the first-pass water-gas shift reactor;

(d) optionally, an additional first-pass water-gas shift reactor is in gas/fluid communication with the first-pass water-gas shift reactor;

(e) the first-pass water-gas shift reactor is in gas/fluid communication with the hydrogen gas separation unit or, if an additional first-pass water-gas shift reactor is present in the system, the additional first-pass water-gas shift reactor is in gas/fluid communication with the hydrogen gas separation unit;

(f) the hydrogen separation unit has a hydrogen gas outlet and a hydrogen-depleted gas outlet, the hydrogen-depleted gas outlet of the hydrogen separation unit is in gas/fluid communication with the second feed inlet of the reforming reactor, where optionally the hydrogen-depleted gas outlet is in gas/fluid communication with the second feed inlet of the reforming reactor through a second heat exchanger.

In a further aspect, the invention is directed to a system, comprising:

a reforming reactor;
a heat exchanger;
a first-pass water-gas shift reactor; and
an additional first-pass water-gas shift reactor having an inlet, a hydrogen-depleted gas outlet, and containing a hydrogen gas separation membrane that is hydrogen-permeable and hydrogen-selective, and that has a hydrogen gas outlet;
where (a) the reforming reactor has first and second feed inlets, first and second flow paths, first and second reforming product outlets, at least one reforming catalyst, and a heat source; where (1) the first feed inlet is in gas/fluid communication with the first flow path;

(2) the first flow path is in gas/fluid communication with at least one reforming catalyst and the first reforming product outlet, and is in heat transfer communication with the heat source;

(3) the second feed inlet is in gas/fluid communication with the second flow path; and (4) the second flow path is in gas/fluid communication with at least one reforming catalyst and the second reforming product outlet, and is in heat transfer communication with the heat source;

(b) the first reforming product outlet of the reforming reactor is in gas/fluid communication with the heat exchanger;

(c) the heat exchanger is in gas/fluid communication with the first-pass water-gas shift reactor;

(d) the first-pass water-gas shift reactor is in gas/fluid communication with the inlet of the additional first-pass water-gas shift reactor;

(e) the hydrogen-permeable hydrogen-selective membrane is located in the additional first-pass water-gas shift reactor to permit gas/fluid communication of hydrogen in the additional first-pass water-gas shift reactor with the hydrogen outlet of the membrane and to inhibit gas/fluid communication of a non-hydrogen gas with the hydrogen outlet;

(f) the hydrogen-depleted gas outlet of the additional first-pass water-gas shift reactor is in gas/fluid communication with the second feed inlet of the reforming reactor, where optionally the hydrogen-depleted gas outlet is in gas/fluid communication with the second feed inlet of the reforming reactor through a second heat exchanger.

DETAILED DESCRIPTION OF THE INVENTION

Figure 1:
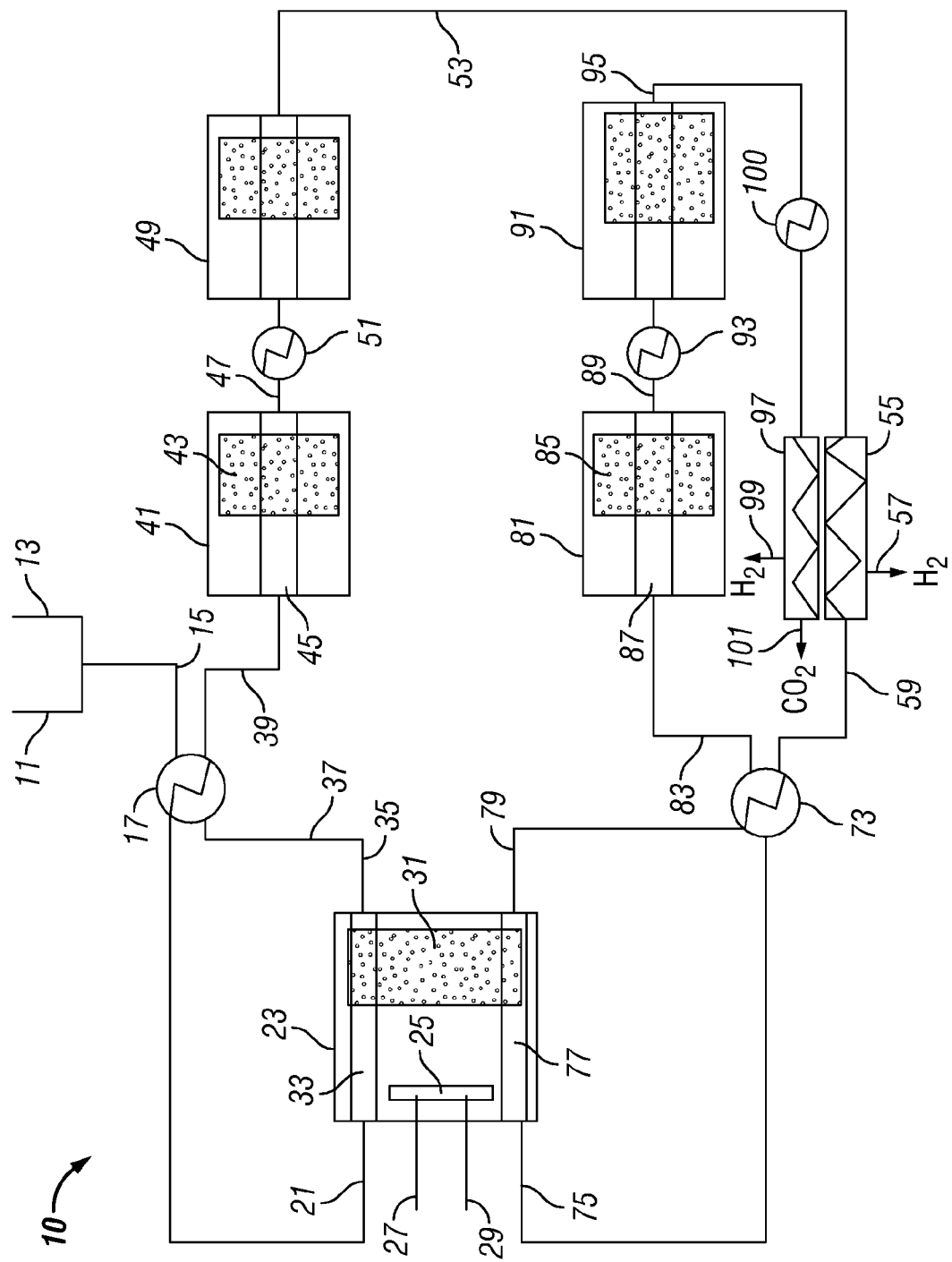
FIG. 1 is a schematic diagram of a system in accordance with the present invention.

The process and system of the present invention produce separate streams of hydrogen and carbon dioxide from a hydrocarbon feedstock, in which most, and preferably substantially all, the hydrocarbon feedstock is converted to hydrogen and carbon dioxide. This provides an improved process and system for energy-efficiently converting a hydrocarbon feedstock into hydrogen and carbon dioxide.

The process and system of the present invention accomplish this by steam reforming and shift reacting a vaporized hydrocarbon, separating hydrogen from the resulting product, and recycling the hydrogen-depleted gas containing unconverted hydrocarbon to be steam reformed. In an embodiment, the reformed product may be shift reacted to convert the remaining unconverted hydrocarbon into hydrogen and carbon dioxide. Hydrogen and carbon dioxide are then separated.

The reaction and enthalpies typically involved in a steam reforming/water-gas shift process can be represented as follows:

(R1) Reforming

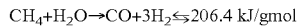
$$CH_4+H_2O \rightarrow CO+3H_2 \leftrightharpoons 206.4 \text{ kJ/gmol}$$

(R2) Water-Gas Shift

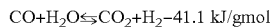
$$CO+H_2O \leftrightharpoons CO_2+H_2 -41.1 \text{ kJ/gmol}$$

(R3) Combination

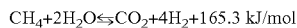
$$CH_4+2H_2O \leftrightharpoons CO_2+4H_2 +165.3 \text{ kJ/mol}$$

The chemical equilibrium of the reactions is one of the main factors that governs the production of hydrogen and carbon dioxide from hydrocarbons such as methane in conventional systems and processes. The present process and system provide a means for removing hydrogen from the product stream after reforming a vaporizable hydrocarbon and subsequently water-gas shifting the reformed products, and recycling the hydrogen-depleted product stream back through a second reforming reaction to convert substantially all of the hydrocarbon. In an embodiment, a process and system of the present invention include a subsequent second water-gas shift reaction of the second reforming reaction product to drive the equilibrium to favor the production of essentially only hydrogen and carbon dioxide.

The processes and systems of the present invention permit the steam reforming reactions and the water-gas shift reactions to be run at temperatures favoring the production of hydrogen from the equilibrium reaction. The steam reforming may be conducted at temperatures of at least 550° C., and preferably from 700° C. to 1100° C., which favors the production of hydrogen since the reforming reaction is very endothermic. The water-gas shift reaction may be run at temperatures of from 200° C. to 500° C., which also favors the production of hydrogen since the shift reaction is slightly exothermic. The water-gas shift reaction is conducted separately from the reforming reaction, thereby avoiding a shift reaction equilibrium unfavorable to the production of hydrogen which occurs when the shift reaction and the reforming reaction are conducted together. In an embodiment of the invention, a hydrogen-permeable hydrogen-selective membrane may be utilized to separate hydrogen produced by the shift reaction from the shift reaction products. Separation of the hydrogen with a membrane at lower temperatures than used to steam reform the hydrocarbon feed enables the shift reaction product to be contacted with the membrane at higher hydrogen partial pressure, increasing the flux of the hydrogen through the membrane which increases the pressure of the resulting hydrogen gas stream, permits reduction of the required membrane size to efficiently separate the hydrogen, and increases the amount of hydrogen removed from the shift reaction product stream.

In one embodiment, the present invention is a process in which a vaporizable hydrocarbon is steam reformed and then water-gas shift reacted, hydrogen is separated from the resulting shift reacted product, and the resulting hydrogen-depleted gas containing unconverted hydrocarbon is recycled to be steam reformed and shift reacted to convert the remaining unconverted hydrocarbon into hydrogen and carbon dioxide. The hydrogen and carbon dioxide may then be separated.

In the process, steam, a hydrocarbon, and a reforming catalyst are contacted at a temperature of at least 550° C., the hydrocarbon being vaporizable at the contact temperature, to produce a first reformed gas according to the reaction: $C_nH_{2n+2}+nH_2O \leftrightharpoons nCO+(2n+1)H_2$. The first reformed gas may also include $H_2O$ as steam since 1) the steam reforming reaction is an incomplete reaction, so that even if a stoichoimetric quantity of steam is used, a minor quantity is found in the reaction product; and 2) the steam reforming reaction is preferably carried out in the presence of a considerable excess of steam to protect the reforming catalyst.

In an embodiment of the process of the invention, the vaporizable hydrocarbon may be one or more $C_nH_{2n+2}$ hydrocarbons, where the feed containing the vaporizable hydrocarbon contains little or no hydrogen sulfide, which poisons most hydrogen-permeable hydrogen-selective membranes and steam reforming catalysts. Preferred $C_nH_{2n+2}$ vaporizable hydrocarbons for use in the process of the present invention include methane, ethane, propane, butane, and isobutane. Methane is most preferred for use in the process, being steam reformed according to the following reaction: $CH_4+H_2O \leftrightharpoons CO+3H_2$. A vaporizable hydrocarbon feed for use in the process may be natural gas, a biofuel gas, coal gas, kerosene, or diesel oil. A particularly preferred feed stream for providing methane as a hydrocarbon is natural gas.

In an embodiment of a process of the invention, the steam for use in the reforming reaction may be provided by heating water, preferably boiler water.

In an embodiment of a process of the invention, the steam reforming reaction may be performed in a steam reforming reactor. The steam reforming reactor may be a conventional steam reforming furnace within which the desired reforming reaction temperatures are achieved by burning a fuel gas, such as natural gas, in the presence of air or oxygen. In a preferred embodiment, the fuel gas is burned in combination with an oxidant such as air or oxygen in a flameless distributed combustion system within the steam reforming reactor to provide the heat to drive the reforming reaction. Flameless distributed combustion systems useful in a steam reforming reactor are described in, for example, U.S. Pat. No. 7,025,940.

In an embodiment of a process of the invention, the steam reforming reactor includes a reforming catalyst therein to assist in effecting the reforming reaction. The reforming catalyst may be any catalyst effective for inducing the reforming reaction. Typically, useful steam reforming catalysts include, but are not limited to, Group VIII transition metals, particularly nickel. The active steam reforming metal may be supported on an inert support. Suitable supports include compounds containing elements of Group III and IV of the Periodic Table, such as, for example, the oxides or carbides of Al, Si, Ti, Mg, Ce, and Zr, most preferably alumina. The catalyst in the steam reforming reactor may be a supported catalyst present in the reactor in a fixed bed.

In an embodiment of a process of the invention, the vaporizable hydrocarbon and steam are contacted with the steam reforming catalyst in the steam reforming reactor at a temperature of at least 550° C. to effect the reforming reaction. Preferably, the vaporizable hydrocarbon and steam are contacted with the reforming catalyst at a temperature of at least 650° C., and more preferably at a temperature of from 700° C. to 1100° C. to effect the reforming reaction since the reforming reaction equilibrium is driven towards the production of hydrogen and carbon monoxide at the higher temperatures.

In an embodiment of a process of the invention, the vaporizable hydrocarbon and steam/water may be preheated in a pre-reformer prior to introduction into the steam reforming reactor. The vaporizable hydrocarbon and the steam/water may be preheated together in the pre-reformer to a temperature of at least 500° C., or to a temperature of at least 550° C. In an embodiment, the vaporizable hydrocarbon and the steam/water may be heated in the pre-reformer by heat exchange with the first reformed gas exiting the steam reforming reactor, thereby cooling the first reformed gas while heating the vaporizable hydrocarbon and the steam/water.

The vaporizable hydrocarbon and the steam may be mixed and fed to the steam reforming reactor as a feedstock at elevated pressure. In an embodiment a mixture of vaporizable hydrocarbon and steam is fed to a steam reformer at a pressure of from 0.5 MPa to 60 MPa, or from 1.5 MPa to 50 MPa. Alternatively the vaporizable hydrocarbon and steam may be fed to the reforming reactor separately, again preferably at elevated pressure. The vaporizable hydrocarbon and steam may be fed separately to the reforming reactor at pressures such that upon being combined in the reforming reactor the pressure of the mixture in the reforming reactor may range from 0.5 MPa to 60 MPa, or from 1.5 MPa to 50 MPa.

The first reformed gas produced by steam reforming the vaporizable hydrocarbon may contain hydrogen, carbon monoxide, steam, unreacted hydrocarbon, and carbon dioxide. Preferably, the first reformed gas contains at least 30 mol % hydrogen, on a wet basis, or at least 60 mol % hydrogen on a dry basis.

In an embodiment of a process of the invention, the first reformed gas may exit the steam reforming reactor at a pressure elevated above atmospheric pressure. For example, the first reformed gas may exit the steam reforming reactor at a pressure of from 0.5 MPa to 30 MPa, typically from 1.5 MPa to 5 MPa.

In an embodiment of a process of the invention, the first reformed gas produced by the steam reforming reaction is cooled to a temperature of from 200° C. to 500° C. to cool the first reformed gas to a temperature at which hydrogen production is favored in the water-gas shift reaction equilibrium. The first reformed gas may be cooled by conventional heat exchange, for example, with water/steam. As noted above, however, the first reformed gas may be cooled by heat exchange with the vaporizable hydrocarbon and steam feed to the steam reforming reactor in a pre-reactor, heating the hydrocarbon/steam feedstock while simultaneously cooling the first reformed gas. The first reformed gas may flow countercurrent to hydrocarbon/steam feedstock in the heat exchange process. Preferably, the first reformed gas is cooled to a temperature of from 300° C. to 450° C., and more preferably to a temperature of from 350° C. to 425° C.

The cooled first reformed gas is contacted with a water-gas shift catalyst to produce a first shift gas containing hydrogen and carbon dioxide according to the following reaction: $CO+H_2O \leftrightharpoons CO_2+H_2$. The cooled first reformed gas may be contacted with a water-gas shift catalyst in a water-gas shift reactor. The shift reactor may be a conventional shift reactor, and the shift catalyst may be a conventional shift catalyst. The shift catalyst may be a Fe, Zn, Cr, Cu, Ni, or Co composition, where the composition may be enriched with alkaline earth metals such as CaO, MgO, and $La_2O_3$, and may be supported on an alumina, titania, zirconia, and/or silica support. Preferably the water-gas shift catalyst is supported in a fixed bed in the shift reactor. The water-gas shift reactor is separate from the steam reforming reactor so that the shift reaction may be effected at temperatures lower than required for the steam reforming reaction.

Optionally, the cooled first reformed gas may be contacted with a water-gas shift catalyst in more than one water-gas shift reactor to produce the first shift gas, where the water-gas shift reactors are arranged serially, and where the shift reacted product of each sequential shift reactor is fed as a feedstock to the next shift reactor in the series. Optionally, within the series of water-gas shift reactors, the shift reacted product of a shift reactor may be cooled by passing the product through a heat exchanger prior to feeding the shift reacted product to the next shift reactor in the series. In an embodiment, the cooled first reformed gas is contacted with a water-gas shift catalyst in a first water-gas shift reactor, the shift reacted product is then cooled to a temperature of from 200° C. to 350° C. by heat exchange with water/steam in a heat exchanger, and then is fed to a second water-gas shift reactor for contact with a second water-gas shift catalyst to produce the first shift gas.

The first shift gas may contain hydrogen, carbon dioxide, hydrocarbons, water (as steam), and carbon monoxide. Preferably the first shift gas contains at least 40 mol % hydrogen on a wet basis, and more preferably at least 50 mol % hydrogen on a wet basis.

The hydrogen present in the first shift gas may then be separated from the first shift gas to produce a first hydrogen gas stream and a hydrogen-depleted gas containing carbon dioxide and at least one vaporized hydrocarbon. The hydrogen-depleted gas may also contain water (as steam) and carbon monoxide.

The hydrogen in the first shift gas may be separated from the first shift gas by either contacting the first shift gas with a hydrogen-permeable hydrogen-selective membrane or by contacting the first shift gas with a porous material selective for adsorbing non-hydrogen gases in the first shift gas, for example, in a pressure swing adsorption vessel. The hydrogen separated from the first shift gas forms the first hydrogen gas stream, and the gas remaining after separation of hydrogen from the first shift gas forms the hydrogen-depleted gas. The hydrogen-depleted gas may contain some hydrogen therein.

In one embodiment, the first hydrogen gas stream and the hydrogen-depleted gas stream may be separated from the first shift gas by contacting the first shift gas with a hydrogen-permeable hydrogen-selective membrane. The term "hydrogen-selective", as used herein in reference to a gas permeable membrane, is defined to mean that the membrane will permit passage of at most 1 mol % of a gas other than hydrogen through the membrane. The term "hydrogen-permeable", as used herein in reference to a gas permeable membrane, is defined to mean that the membrane will permit passage of hydrogen through the membrane. A hydrogen-permeable hydrogen-selective membrane may permit diffusion of essentially pure hydrogen gas, the diffused gas having less than 1 part per million impurities.

The hydrogen-permeable hydrogen-selective membrane may include a hydrogen-permeable hydrogen-selective metal, and may be shaped in tube-form or sheet-form. Hydrogen-permeable hydrogen-selective metals and alloys useful for preparing the membrane include Pt, Ni, Au, Pd, Pd—V, Pd—Ta, Pd—Nb, Pd—Ag and Pd—Au. Palladium and its alloys are particularly useful in forming the hydrogen-permeable hydrogen-selective membranes. The hydrogen-permeable hydrogen-selective membrane should be capable of operating at a temperature of at least 150° C. up to 500° C. The hydrogen-permeable hydrogen-selective membrane may preferably operate at pressures up to 20 MPa, or up to 10 MPa, or up to 5 MPa.

Hydrogen-permeable hydrogen-selective membrane tubes may be formed as described in U.S. Pat. No. 2,773,561. Hydrogen-permeable hydrogen selective membrane sheets of palladium or platinum may be formed as described in U.S. Pat. No. 1,174,631. In a preferred embodiment, the hydrogen-permeable hydrogen-selective membrane is a tube formed in accordance with the disclosure of either U.S. Patent Publication No. 2004/0244590 or PCT publication WO 99/30806 utilizing palladium or a palladium/silver alloy as a hydrogen-permeable hydrogen-selective membrane layer.

The hydrogen-permeable hydrogen-selective membrane may be positioned separate from the water-gas shift reactor(s) but coupled in gas/fluid communication to the water-gas shift reactor producing the first shift gas. If more than one water-gas shift reactors are utilized to effect the shift reaction and form the first shift gas, the hydrogen-permeable hydrogen-selective membrane may be coupled in gas/fluid communication to the final shift reactor in the series of shift reactors.

The hydrogen-permeable hydrogen-selective membrane may also be located in a water-gas shift reactor. Preferably, if the membrane is located in a water-gas shift reactor, it is located in the final shift reactor of a series of two or more shift reactors, where the shift reacted product produced in one or more initial shift reactors is cooled by heat exchange to a temperature of from 200° C. to at most 400° C., or at most 350° C. prior to entry into the final shift reactor containing the membrane.

Diffusion of the first hydrogen gas from the first shift gas through the hydrogen-permeable hydrogen-selective membrane in accordance with a process of the present invention may be accomplished at a high flux rate. The high flux rate of hydrogen through the membrane is achieved by contacting the first shift gas with the membrane at relatively high pressure, which results in a relatively high partial pressure of hydrogen in contact with the membrane. As noted above, the first shift gas may be contacted with the membrane at pressures of up to 20 MPa, or up to 10 MPa, or up to 5 MPa, where typically the first shift gas is contacted with the membrane at a pressure of from 2 MPa to 5 MPa.

The first shift gas may be contacted with the membrane at such relatively high pressures due to the relatively low temperature of the shift gas. At high temperatures, for example, above 450° C., or above 500° C., hydrogen-permeable hydrogen-selective membranes operate near their temperature limit. Relatively high pressures, for example, greater than 2 MPa, at temperatures near the operational limit of the membrane reduce the lifespan of the membrane, so high pressure contact of a shift gas at high temperature is avoided. In the process of the invention, the relatively low temperature of the shift gas in contact with the membrane permits the shift gas to be contacted with the membrane at pressures greater than 2 MPa, increasing the flux of hydrogen through the membrane relative to the flux of a high temperature, low pressure shift gas with a membrane.

Contact of the relatively high pressure, e.g. greater than 2 MPa, first shift gas with a hydrogen-permeable hydrogen-selective membrane also may increase the energy efficiency of the process of invention relative to a process in which hydrogen is separated from a shift gas by contact with a membrane at relatively low pressure. The first hydrogen gas stream separated from the first shift gas at relatively high pressure itself has a relatively high pressure compared to a hydrogen gas stream separated by contact with a membrane at relatively low pressure. For commercial purposes, hydrogen gas must be high pressure, and typically requires compression when separated by diffusion through a hydrogen-permeable hydrogen-selective membrane. Less compression, and therefore, less energy to provide compressive power, is required to prepare the relatively high pressure first hydrogen gas stream of the present invention for commercial use than a hydrogen gas stream separated by diffusion through a membrane at relatively low pressure.

Contact of a relatively high pressure first shift gas with a hydrogen-permeable hydrogen-selective membrane may also reduce the contact area of the membrane required to separate the hydrogen from the first shift gas relative to membrane area required to separate the same quantity of hydrogen from a lower pressure shift gas having the same composition. Higher pressure of the shift gas increases the partial pressure of hydrogen in the shift gas, which increases the amount of hydrogen diffused through a defined area of the hydrogen-permeable hydrogen-selective membrane. Higher diffusion, or flux, of the first hydrogen gas stream through the membrane, therefore, permits use of a smaller membrane since less membrane area is required to obtain desirable diffusion rates and quantities of the first hydrogen gas stream through the membrane.

In a preferred embodiment, steam is used as a sweep gas to sweep the first hydrogen gas stream from the membrane as it diffuses through the membrane. Removal of the first hydrogen gas stream from the membrane as it diffuses through the membrane may increase the flux rate of hydrogen through the membrane. As noted above, increased flux rate of hydrogen through the membrane permits the use of smaller membranes since a defined area of the membrane diffuses more hydrogen through the membrane at higher flux rates. The steam sweep gas may be separated from the first hydrogen gas stream by cooling the mixture of sweep gas and first hydrogen gas stream to a temperature at which the steam condenses, and separating the first hydrogen gas stream from the condensed steam (water).

The products of contacting the first shift gas with the hydrogen-permeable hydrogen-selective membrane are the first hydrogen gas stream and the hydrogen-depleted gas. The first hydrogen gas stream may be combined with a second hydrogen gas stream, produced as described below, to form a hydrogen product stream. The first hydrogen gas stream preferably contains, on a dry basis, at least 97 mol % hydrogen, more preferably at least 99 mol % hydrogen, and most preferably at least 99.5 mol % hydrogen. The hydrogen-depleted gas contains carbon dioxide, a vaporizable hydrocarbon, and steam, and may contain carbon monoxide. The hydrogen-depleted gas may contain, on a dry basis, at least 5 mol %, or at least 10 mol %, or at least 15 mol % vaporizable hydrocarbons. The hydrogen-depleted gas is processed further to produce additional hydrogen, as described in more detail below.

In another embodiment of a process of the present invention, the first hydrogen gas stream and hydrogen-depleted gas may be separated from the first shift gas by contacting the first shift gas with a porous material selective for adsorbing non-hydrogen gases, preferably in one or more pressure swing adsorption vessels. Pressure swing adsorption vessels including porous materials selective for adsorbing non-hydrogen gases are commercially available.

The term "non-hydrogen gases", as used herein in reference to a porous material used in a pressure swing adsorption vessel, is defined to mean gases other than hydrogen in the first shift gas including carbon dioxide, steam, carbon monoxide, and vaporizable hydrocarbons in the first shift gas. The porous material includes any solid material capable of selectively adsorbing non-hydrogen gases from the first shift gas to provide the first hydrogen gas stream. In one embodiment, the porous material is a carbon molecular sieve, an activated carbon, or a zeolite.

The first shift gas may be contacted with the porous material in a pressure swing adsorption vessel at a pressure under which the non-hydrogen gases adsorb to the porous material. The first shift gas may be contacted with the porous material to produce the first hydrogen gas stream at a pressure of at least 0.5 MPa, or at least 0.75 MPa, or at least 1 MPa, or at least 1.5 MPa, or at least 2 MPa. In an embodiment of a process of the present invention, the first shift gas may be contacted with the porous material in the pressure swing adsorption vessel to produce the first hydrogen gas stream at a pressure of from 0.5 MPa to 20 MPa, or from 0.75 MPa to 10 MPa, or from 1 MPa to 5 MPa.

Upon contact of the first shift gas with the porous material in a pressure swing adsorption vessel under pressure, the non-hydrogen gases adsorb to the porous material, and hydrogen in the first shift gas is separated from the non-hydrogen gases and flows through the pressure swing adsorption vessel to form the first hydrogen gas stream. The hydrogen-depleted gas is recovered by separating the porous material on which the non-hydrogen gas is adsorbed from the first shift gas and depressurizing the porous material, freeing the hydrogen-depleted gas from the porous material. In an embodiment, the porous material is depressurized to atmospheric pressure to release the hydrogen-depleted gas.

In an embodiment, the first shift gas may be contacted with a porous material selective for adsorbing non-hydrogen gases in two or more pressure swing adsorption vessels. The first shift gas may be alternately contacted with a first porous material in a first pressure swing adsorption vessel and then with a second porous material in a second pressure swing adsorption vessel, and, may be contacted with a third or more porous material in a third or more pressure swing adsorption vessels in sequence. The porous material in one or more pressure swing adsorption vessel(s) may be depressurized to release the hydrogen-depleted gas while the first shift gas is contacted with a porous material in another pressure swing adsorption vessel.

The products of contacting the first shift gas with a porous material in a pressure swing adsorption vessel and then depressurizing the porous material with adsorbed non-hydrogen gases are the first hydrogen gas stream and the hydrogen-depleted gas. The first hydrogen gas stream may be combined with a second hydrogen gas stream, produced as described below, to form a hydrogen product stream. The first hydrogen gas stream preferably contains, on a dry basis, at least 97 mol % hydrogen, more preferably at least 99 mol % hydrogen, and most preferably at least 99.5 mol % hydrogen. The hydrogen-depleted gas contains carbon dioxide, a vaporizable hydrocarbon, and steam, and may contain carbon monoxide. The hydrogen-depleted gas may contain, on a dry basis, at least 5 mol %, or at least 10 mol %, or at least 15 mol % vaporizable hydrocarbons.

The hydrogen-depleted gas obtained by depressurizing the porous material may be processed further to produce additional hydrogen, as described in more detail below after being compressed. The hydrogen-depleted gas may be compressed to a pressure of from 0.5 MPa to 60 MPa, or from 1.5 MPa to 50 MPa. The hydrogen-depleted gas may be compressed in accordance with conventional methods of compressing a gas.

In a process of the present invention, the hydrogen-depleted gas separated from the first shift gas by either a hydrogen-selective hydrogen-permeable membrane or by adsorption and subsequent desorption from a porous material selective for adsorbing non-hydrogen gases in a pressure swing adsorption vessel and subsequent compression may be contacted with a reforming catalyst at a temperature of at least 550° C. to produce a second reformed gas containing hydrogen, carbon monoxide, and steam. The second reformed gas may also contain carbon dioxide. The hydrogen-depleted gas must be heated to a temperature of at least 550° C. for the reforming reaction, and may be heated by any convenient means. In an embodiment, the hydrogen-depleted gas is heated to a temperature of at least 550° C. by heat exchange with the second reformed gas, produced as described below.

The hydrogen-depleted gas may be contacted with the reforming catalyst at a temperature of at least 550° C. in a steam reforming reactor to produce the second reformed gas. In an embodiment of a process of the present invention, the hydrogen-depleted gas is contacted with the reforming catalyst in the steam reforming reactor at a temperature of at least 650° C., and more preferably at a temperature of from 700° C. to 1100° C.

Preferably the steam reforming reactor is the same steam reforming reactor used to produce the first reformed gas from the initial hydrocarbon feedstock, where the steam reforming reactor may be heated as described above to effect the reforming reaction of the hydrogen-depleted gas to the second reformed gas. Although the hydrogen depleted gas may be steam reformed into the second reformed gas in the same steam reforming reactor used to produce the first reformed gas from the hydrocarbon feedstock, the hydrogen depleted gas is reformed into the second reformed gas separate from the hydrocarbon feedstock. Most preferably the hydrogen-depleted gas is reformed into the second reformed gas in the same steam reforming reactor used to produce the first reformed gas but separate from the initial vaporizable hydrocarbon, steam, and first reformed gas.

The reforming catalyst used in the steam reforming reactor to reform the hydrogen-depleted gas may be any catalyst effective for inducing the reforming reaction, such as those listed above with respect to the reforming catalyst utilized in producing the first reformed gas. Preferably the reforming catalyst used in reforming the hydrogen-depleted gas to the second reformed gas is the same type of catalyst used in producing the first reformed gas. Most preferably, the reforming catalyst utilized in producing the second reformed gas from the hydrogen-depleted gas is the same catalyst used in producing the first reformed gas, where the reforming catalyst for producing the second reformed gas is located in the same steam reforming reactor as the reforming catalyst for producing the first reformed catalyst. More preferably, the reforming catalyst utilized to produce the second reformed gas is located in a fixed bed within the reforming reactor. Preferably the fixed bed containing the reforming catalyst for converting the hydrogen-depleted gas to the second reformed gas is the same fixed bed containing the reforming catalyst used to produce the first reformed gas, the fixed bed being located in a position where the hydrogen-depleted gas may selectively contact the reforming catalyst to produce the second reformed gas apart from the contact of the reforming catalyst with the vaporizable hydrocarbon and steam to produce the first reformed gas.

The second reformed gas produced by steam reforming the hydrogen-depleted gas may contain hydrogen, carbon monoxide, steam, and carbon dioxide. Preferably the second reformed gas contains, on a dry basis, at least 30 mol % hydrogen, at least 35 mol % hydrogen, or at least 40 mol % hydrogen. The second reformed gas also contains little or no hydrocarbons, preferably, on a dry basis, from 0-2 mol % hydrocarbons, more preferably from 0-1 mol % hydrocarbons, and most preferably from 0-0.5 mol % hydrocarbons.

In an embodiment of a process of the invention, the second reformed gas produced by the steam reforming reaction is cooled to a temperature of from 200° C. to 500° C. to cool the second reformed gas to a temperature at which hydrogen production is favored in the water-gas shift reaction equilibrium. The second reformed gas may be cooled by conventional heat exchange, for example, with water/steam. As noted above, however, it is preferred to cool the second reformed gas by heat exchange with the hydrogen-depleted gas prior to the hydrogen-depleted gas entering the steam reforming reactor, heating the hydrogen-depleted gas while simultaneously cooling the second reformed gas. Most preferably the second reformed gas flows countercurrent to the hydrogen-depleted gas in the heat exchange process. The second reformed gas may be cooled to a temperature of from 300° C. to 450° C., or to a temperature of from 350° C. to 425° C.

The cooled second reformed gas may be contacted with a water-gas shift catalyst in a water-gas shift reactor to produce a second shift gas containing hydrogen and carbon dioxide. The shift reactor may be a conventional shift reactor and the shift catalyst may be a conventional shift catalyst, however, the shift reactor should be a separate reactor from any of the shift reactors utilized to produce the first shift product to avoid combining the largely hydrocarbon-free second reformed gas and second shift gas with the first reformed gas or first shift gas. The shift reactor should be separate from the steam reforming reactor so that the shift reaction to produce the second shift product may be effected at temperatures lower than required for the steam reforming reaction in order to drive the shift reaction equilibrium towards the production of hydrogen and carbon dioxide.

Optionally, the cooled second reformed gas may be contacted with a water-gas shift catalyst in more than one water-gas shift reactor to produce the second shift gas, where the water-gas shift reactors are arranged serially, and where the shift reaction product of each sequential shift reactor is fed as a feedstock to the next shift reactor in the series. Again, any shift reactors used to produce the shift reaction products from the second reformed gas should be separate from the shift reactors used to form the first shift gas. Optionally, within the series of water-gas shift reactors, the shift reacted product of a shift reactor may be cooled by passing the product through a heat exchanger prior to feeding the shift reacted product to the next shift reactor in the series. In an embodiment, the cooled second reformed gas may have a temperature of from 350° C. to 500° C. and may be contacted with a water-gas shift catalyst in a first water-gas shift reactor to produce a shift reaction product from the second reformed gas, the shift reaction product is then cooled to a temperature of from 200° C. to 350° C. by heat exchange with water/steam in a heat exchanger, and then the cooled shift reaction product is fed to a second water-gas shift reactor to produce a second shift gas.

The second shift gas may contain hydrogen, carbon dioxide, and steam. Preferably the second shift gas may contain, on a dry basis, at least 35 mol % hydrogen, at least 40 mol % hydrogen, or at least 45 mol % hydrogen. Preferably the second shift gas may contain, on a dry basis, at least 30 mol % carbon dioxide, at least 35 mol % carbon dioxide, or at least 40 mol % carbon dioxide. The second shift gas may contain, on a dry basis, at most 10 mol %, preferably at most 5 mol %, and most preferably at most 1 mol % of gases other than hydrogen or carbon dioxide. In particular, the second shift gas may contain at most 2 mol % hydrocarbons, or at most 1 mol % hydrocarbons, or at most 0.5 mol % hydrocarbons on a dry basis.

In an embodiment of a process of the present invention, the second shift gas may be separated into a second hydrogen gas stream and a carbon dioxide stream by any convenient means to separate hydrogen and carbon dioxide. In one embodiment, the hydrogen and carbon dioxide are separated by contacting the second shift gas with a hydrogen-permeable hydrogen-selective membrane. In another embodiment, the hydrogen and carbon dioxide are separated by contacting the second shift gas with a porous material in a pressure swing adsorption vessel. In another embodiment, the hydrogen and second shift gas are separated by cooling the second shift gas to a temperature effective to condense and separate the carbon dioxide from the hydrogen.

In the embodiment in which hydrogen and carbon dioxide are separated by contacting the second shift gas with a hydrogen-permeable hydrogen-selective membrane, the hydrogen-permeable hydrogen-selective membrane may be of the types described above relative to separating the first hydrogen gas stream from the first shift gas. The hydrogen-permeable hydrogen-selective membrane which is contacted with the second shift gas should be a separate membrane, however, from any membrane used to separate the first hydrogen gas stream from the first shift gas to avoid contaminating the second hydrogen gas stream or carbon dioxide stream separated from the second shift gas with any hydrocarbons separated from the first shift gas.

The hydrogen-permeable hydrogen-selective membrane may be located separately from the water-gas shift reactor(s) used to produce the second shift gas but coupled in gas/fluid communication with the shift reactor used to produce the second shift gas. If more than one water-gas shift reactors are utilized to effect the shift reaction and form the second shift gas, the hydrogen-permeable hydrogen-selective membrane may be coupled in gas/fluid communication to the final shift reactor in the series of shift reactors. The second shift gas may be cooled sufficiently to condense steam from the second shift gas prior to contacting the second shift gas with the membrane by passing the second shift gas through a heat exchanger.

In another embodiment, the hydrogen-permeable hydrogen-selective membrane may be located in a water-gas shift reactor. Preferably, if the membrane is located in a water-gas shift reactor, it is located in the final shift reactor of a series of two or more shift reactors, where the shift reacted product produced in one or more initial shift reactors is cooled by heat exchange to a temperature of from 200° C. to at most 400° C., or at most 350° C. prior to entry into the final shift reactor containing the membrane.

Diffusion of the second hydrogen gas from the second shift gas through the hydrogen-permeable hydrogen-selective membrane in accordance with the process of the present invention may be accomplished at a high flux rate. The high flux rate of hydrogen through the membrane may be achieved by contacting the second shift gas with the membrane at relatively high pressure, which results in relatively high partial pressure of hydrogen in contact with the membrane. The second shift gas may be contacted with the membrane at pressures of up to 20 MPa, or up to 10 MPa, or up to 5 MPa, where typically the second shift gas is contacted with the membrane at a pressure from 2 MPa to 5 MPa.

The second shift gas may be contacted with the membrane at such relatively high pressures due to the relatively low temperature of the second shift gas, particularly when the second shift gas is contacted with the membrane at ambient temperatures. As discussed above, hydrogen-permeable hydrogen-selective membranes operate near their operational limit at relatively high temperatures, e.g. above 450° C. or above 500° C., which limits the pressure that may be applied against the membrane. In the process of the invention, the relatively low temperature of the second shift gas in contact with the membrane permits the shift gas to be contacted with the membrane at pressures greater than 2 MPa, increasing the flux of hydrogen through the membrane relative to the flux attainable at relatively high temperatures. Further, as discussed above relative to separating the first hydrogen stream from the first shift gas, energy efficiency is increased by contacting the second shift gas with the membrane at high pressure since less energy is required to compress the second hydrogen stream diffusing across the membrane.

Steam may be used as a sweep gas to sweep the second hydrogen gas stream from the membrane. As noted above with respect to the first hydrogen gas stream, use of steam as a sweep gas and the relatively high pressures at which the second shift gas may be contacted with the membrane enable the use of smaller membranes since less membrane contact area is required to separate the second hydrogen gas stream from the second shift gas.

In another embodiment, the second hydrogen gas stream and the carbon dioxide stream may be separated from the second shift gas by contacting the second shift gas with a porous material selective for adsorbing non-hydrogen gases, particularly carbon dioxide, in one or more pressure swing adsorption vessels. The second shift gas is preferably not combined with the first shift gas for contact with such a porous material to avoid contaminating the carbon dioxide stream with any hydrocarbons present in the first shift gas. The porous material useful in the separation of non-hydrogen gases, particularly carbon dioxide, from the second shift gas includes, but is not limited to, a carbon molecular sieve, an activated carbon, or a zeolite. Pressure swing adsorption vessels including porous materials selective for adsorbing non-hydrogen gases, particularly carbon dioxide, are commercially available.

The second shift gas is contacted with the porous material in a pressure swing adsorption vessel at a pressure under which non-hydrogen gases, particularly carbon dioxide, adsorb to the porous material. The second shift gas may be contacted with the porous material to produce the second hydrogen gas stream at a pressure of at least 0.5 MPa, or at least 0.75 MPa, or at least 1 MPa, or at least 1.5 MPa, or at least 2 MPa. In one embodiment, the second shift gas may be contacted with the porous material to produce the second hydrogen gas stream at a pressure of from 0.5 MPa to 20 MPa, of from 0.75 MPa to 10 MPa, or from 1 MPa, to 5 MPa.

The second shift gas may be cooled to a temperature effective to condense any steam from the second shift gas prior to contact with a porous material in a pressure swing adsorption vessel. In one embodiment, the second shift gas may be cooled by heat exchange with water/steam to ambient temperatures prior to contact with the porous material in a pressure swing adsorption vessel.

Upon contact of the second shift gas with the porous material in a pressure swing adsorption vessel under pressure, the carbon dioxide adsorbs to the porous material and hydrogen in the second shift gas is separated from the carbon dioxide and flows through the pressure swing adsorption vessel to form the second hydrogen gas stream. The carbon dioxide may be recovered by separating the porous material on which the carbon dioxide is adsorbed from the second shift gas and depressurizing the porous material, freeing the carbon dioxide from the porous material. The porous material may be depressurized to atmospheric pressure to release the carbon dioxide.

In an embodiment, the second shift gas is contacted with a porous material selective for adsorbing non-hydrogen gases, particularly carbon dioxide, in two or more pressure swing adsorption vessels. The second shift gas may be alternately contacted with a first porous material in a first pressure swing adsorption vessel for separating non-hydrogen gases, particularly carbon dioxide, and hydrogen from the second shift gas, and then contacted with a second porous material in a second pressure swing adsorption vessel for separating non-hydrogen gases, particularly carbon dioxide, and hydrogen from the second shift gas, and, may be contacted with a third or more porous material in a third or more pressure swing adsorption vessel in sequence. The porous material in one or more pressure swing adsorption vessel(s) may be depressurized to release the carbon dioxide while the second shift gas is contacted with a different porous material in a different pressure swing adsorption vessel.

In another embodiment, the second shift gas is cooled to a temperature effective to condense and separate carbon dioxide from hydrogen in the second shift gas, resulting in a carbon dioxide stream and a second hydrogen gas stream. Preferably the second shift gas is cooled to a temperature effective to condense and separate steam in the second shift gas, and subsequently is cooled to a temperature effective to condense and separate carbon dioxide from hydrogen. The second shift gas may be cooled to a temperature sufficiently low to separate the carbon dioxide stream from the second shift gas by refrigerating the second shift gas.

The second hydrogen gas stream separated from the second shift gas, whether by membrane, pressure swing adsorption, or temperature adjustment, preferably has a hydrogen content, on a dry basis, of at least 97 mol %, more preferably at least 99 mol %, and most preferably at least 99.5 mol %. Any steam present in the second hydrogen gas stream may be removed by cooling the second hydrogen gas stream to a temperature at which the steam condenses and separating the second hydrogen gas stream from the condensed steam.

The carbon dioxide stream separated from the second shift gas, whether by membrane, pressure swing adsorption, or temperature adjustment, preferably has a carbon dioxide content, on a dry basis, of at least 75 mol %, preferably at least 80 mol % and most preferably at least 85 mol %. The carbon dioxide stream, on a dry basis, preferably has from 0-2 mol % hydrocarbons, more preferably from 0-1 mol % hydrocarbons, and most preferably from 0-0.5 mol % hydrocarbons.

The first and second hydrogen gas streams produced by the process of the present invention may be combined into a hydrogen product stream. The hydrogen product stream, when either the first or second hydrogen gas stream is separated by diffusion through a membrane, may require compression for commercial viability.

In an embodiment of the process of the invention, hot flue gases exhausted from the steam reforming reactor may be used to heat steam to temperature of above 650° C., preferably from 700° C. to 1100° C., by heat exchange with the steam in a heat exchanger. The steam may also be pressurized to a pressure of from about 1 MPa to 2 MPa. The hot pressurized steam may be expanded through a turbine, and the energy generated in the turbine by expansion of the hot pressurized steam through the turbine may be utilized to compress the hydrogen product stream to a desired pressure. In one embodiment the hydrogen product stream may be compressed to a pressure of from about 0.5 MPa to 50 MPa.

In an embodiment of the process of the present invention, the energy generated in the turbine by expansion of the hot pressurized steam through the turbine may also be utilized to compress the hydrogen-depleted gas after desorption of the hydrogen-depleted gas from a porous material selective for adsorbing non-hydrogen gases prior to contacting the hydrogen-depleted gas with the reforming catalyst in the reforming reactor. As noted above, the desorbed hydrogen-depleted gas may be compressed to a pressure of from 0.5 MPa to 60 MPa, or from 1.5 MPa to 50 MPa.

In another aspect, the invention is a process for producing hydrogen gas and carbon dioxide from a feed gas containing at least 30 mol % hydrogen, at least 5 mol % carbon dioxide, a hydrocarbon, carbon monoxide, and steam.

Hydrogen may be separated from the feed gas to provide a first hydrogen gas stream and a hydrogen-depleted gas containing carbon dioxide, steam, a hydrocarbon, and carbon monoxide. The first hydrogen gas stream may be separated by contacting the feed gas at a pressure of from 0.5 MPa to 60 MPa with a hydrogen-permeable, hydrogen-selective membrane or by contacting the feed gas with a porous material in a pressure swing adsorption vessel. Separation of the first hydrogen gas stream by membrane or by contact with a porous material in a pressure swing adsorption vessel may be conducted as described above with respect to separating a first hydrogen gas stream from a first shift gas.

The hydrogen-depleted gas may be optionally compressed to a pressure of from 0.5 MPa to 60 MPa and contacted with a reforming catalyst at a temperature of at least 550° C. to produce a reformed gas containing hydrogen, carbon monoxide, steam, and optionally carbon dioxide. The hydrogen-depleted gas may be contacted with a reforming catalyst in a steam reforming reactor at a temperature of at least 550° C. as described above with respect to contacting a vaporizable hydrocarbon and steam with a reforming catalyst to produce a first shift gas. In an embodiment, the hydrogen-depleted gas may be contacted with a reforming catalyst in a steam reforming rector at a temperature of at least 650° C., or from 700° C. to 1100° C.

The reformed gas containing hydrogen, carbon monoxide, and steam may be cooled to a temperature of from 200° C. to 500° C. and then contacted with a water-gas shift reaction catalyst to produce a shift gas containing hydrogen and carbon dioxide. The reformed gas may be cooled by heat exchange with water/steam in a conventional heat exchanger. The cooled reformed gas may be contacted with a water-gas shift reaction catalyst in one or more water-gas shift reactors as described above with respect to contacting the second reformed gas with a water-gas shift catalyst in one or more water-gas shift reactors.

The shift gas may be separated into a second hydrogen gas stream and a carbon dioxide stream. The shift gas may be separated into a second hydrogen gas stream and a carbon dioxide stream by contact with a hydrogen-permeable hydrogen-selective membrane, by pressure swing adsorption, or by cooling the shift gas to separate the carbon dioxide stream from the shift gas. The shift gas may be separated into a second hydrogen gas stream and carbon dioxide by contact with a membrane, by pressure swing adsorption, or by cooling to separate the carbon dioxide stream as described above with respect to separating a second hydrogen gas stream and a carbon dioxide stream from the second shift gas.

The first and second hydrogen gas streams may be combined to form a hydrogen product stream. The hydrogen product stream, if either of the first or second hydrogen gas streams were separated by diffusion through a hydrogen-permeable hydrogen-selective membrane, may be pressurized. The hydrogen product stream may be pressurized as described above with respect to pressurizing a hydrogen product stream.

Referring now to FIG. 1, a system 10 in accordance with the present invention is shown. A hydrocarbon feed line 11 and a water/steam feed line 13 provide conduits to provide the hydrocarbon and water/steam for reforming and shift reacting to provide the hydrogen and carbon dioxide product streams. The hydrocarbon feed line 11 and water/steam feed line 13 are coupled in gas/fluid communication with a first heat exchanger feed line 15. The first heat exchanger feed line 15 is coupled in gas/fluid communication with a first heat exchanger 17. The first heat exchanger 17 is preferably a pre-reformer for heating the combined hydrocarbon and steam to temperatures of at least 550° C. The first heat exchanger 17 is coupled in gas/fluid communication with a first reforming reactor feed inlet 21.

The system 10 includes a steam reforming reactor 23. The steam reforming reactor 23 includes a heat source 25, which may be combustion device that burns fuel and oxygen or air entering the reforming reactor 23 through a fuel inlet 27 and an oxidant inlet 29, respectively. The combustion device may be used to control the temperature in the steam reforming reactor to a temperature of at least 550° C., more preferably to a temperature of from 700° C. to 1100° C. Most preferably the combustion device is a flameless distributed combustor.

The steam reforming reactor 23 also includes a reforming catalyst 31 for effecting a reforming reaction in the presence of a hydrocarbon and steam at a temperature of at least 550° C. The reforming catalyst may be any catalyst effective for catalyzing a reforming reaction. Preferred catalysts are described above with respect to the process of the present invention.

The first reforming reactor feed inlet 21 provides an inlet into the steam reforming reactor 23 for the hydrocarbon/steam feed, and is coupled in gas/fluid communication with a first flow path 33 through the reactor 23. The first flow path 33 is in gas/fluid communication with the reforming catalyst 31 and is in heat transfer communication with the heat source 25 so the hydrocarbon/steam feed may be contacted with the catalyst 31 while being exposed to heat from the heat source 25 in order to effect the steam reforming reaction. The first flow path 33 is in gas/fluid communication with a first reforming reactor outlet 35 through which a first reformed gas may exit the reforming reactor 23.

The first reforming reactor outlet 35 is coupled in gas/fluid communication with a heat exchanger to cool the first reformed gas exiting the reforming reactor 23. In one embodiment, the heat exchanger is the first heat exchanger 17. In a preferred embodiment, the first reformed gas passes through the first heat exchanger 17 countercurrent to the hydrocarbon/steam feed entering the first heat exchanger 17 through the first heat exchanger feed line 15 positioned so that the first reformed gas exchanges heat with the hydrocarbon/steam feed to cool the first reformed gas and heat the hydrocarbon/steam feed. Preferably, the first heat exchanger 17 may cool the first reformed gas to a temperature of from 200° C. to 500° C. and warm the hydrocarbon/steam feed to a temperature of at least 550° C. by heat exchange between the first reformed gas and the hydrocarbon/steam feed.

The first heat exchanger 17 is coupled in gas/fluid communication with a first-pass water-gas shift reactor 41 through line 39. The cooled first reformed gas may exit the first heat exchanger 17 and pass into the first-pass water-gas shift reactor 41 through line 39. The first-pass water-gas shift reactor 41 may contain a water-gas shift catalyst 43 which is effective for catalyzing a water-gas shift reaction with constituents of the cooled first reformed gas at a temperature of from 200° C. to 500° C. The water-gas shift catalyst 43 may be any catalyst effective for catalyzing a water-gas shift reaction. Preferred catalysts are described above with respect to the process of the present invention.

A shift reaction flow path 45 passes through the first-pass water-gas shift reactor coupled in gas/fluid communication with line 39, the water-gas shift catalyst 43, and first-pass shift reactor outlet 47. Cooled first reformed gas may enter the first-pass water-gas shift reactor 41 through line 39, enter the shift reaction flow path 45 and contact the water-gas shift catalyst 43, and exit the first-pass shift reactor outlet 47 as a first shift gas.

Optionally, the system 10 may include one or more additional first-pass water-gas shift reactors, shown in FIG. 1 as a single reactor 49, which are coupled in gas/fluid communication with the first-pass water-gas shift reactor 41 through outlet 47. If more than one additional shift reactor 49 is utilized, the additional shift reactors are arranged in a series with the outlet of a preceding shift reactor coupled in gas-fluid communication with the inlet of the next shift reactor in the series. The one or more additional shift reactors 49 may include a water-gas shift reaction catalyst that may be any catalyst effective to catalyst a water-gas shift reaction, and preferably is the same type of catalyst as used in shift reactor 41.

Further, optionally, the first additional first-pass water-gas shift reactor 49 may be coupled in gas/fluid communication to the first-pass water-gas shift reactor 41 through a shift product heat exchanger 51 coupled in gas/fluid communication with outlet 47, and each additional shift reactor 49 in the series of shift reactors 49, if any, may be coupled in gas/fluid communication with the next shift reactor in the series through a shift product heat exchanger 51. A shift product exiting shift reactor 41 through outlet 47 may pass directly to shift reactor 49 for further shift reaction, or may pass through the shift heat exchanger 51 to cool the shift product then pass to shift reactor 49 for further shift reaction to form the first shift gas. Similarly, a shift reaction product exiting one of the additional first-pass water-gas shift reactors 49 may pass directly to the next shift reactor 49 in the series of additional shift reactors 49, if any, or may pass through a shift product heat exchanger 51 first.

The outlet 47 of the first-pass water-gas shift reactor, or outlet 53 if one or more additional first-pass water-gas shift reactors are present, may be coupled in gas/fluid communication to a hydrogen separation unit 55. The hydrogen separation unit 55 includes means for separating hydrogen from the first shift gas to form a first hydrogen gas stream and a hydrogen-depleted gas stream. The hydrogen separation unit includes a hydrogen gas outlet 57 and a hydrogen-depleted gas outlet 59. The first shift gas may enter the hydrogen separation unit 55 and a first hydrogen gas stream may be separated from the first shift gas and directed through the hydrogen gas outlet 57. The hydrogen-depleted gas remaining after separation of the first hydrogen gas stream may exit the hydrogen gas unit 55 through the hydrogen-depleted gas outlet 59. In one embodiment, the hydrogen separation unit 55 comprises one or more hydrogen-permeable hydrogen-selective membranes. In another embodiment, the hydrogen separation unit 55 comprises one or more pressure swing adsorption vessels containing a porous material selective for adsorbing non-hydrogen gases in the first shift gas.

Figure 2:
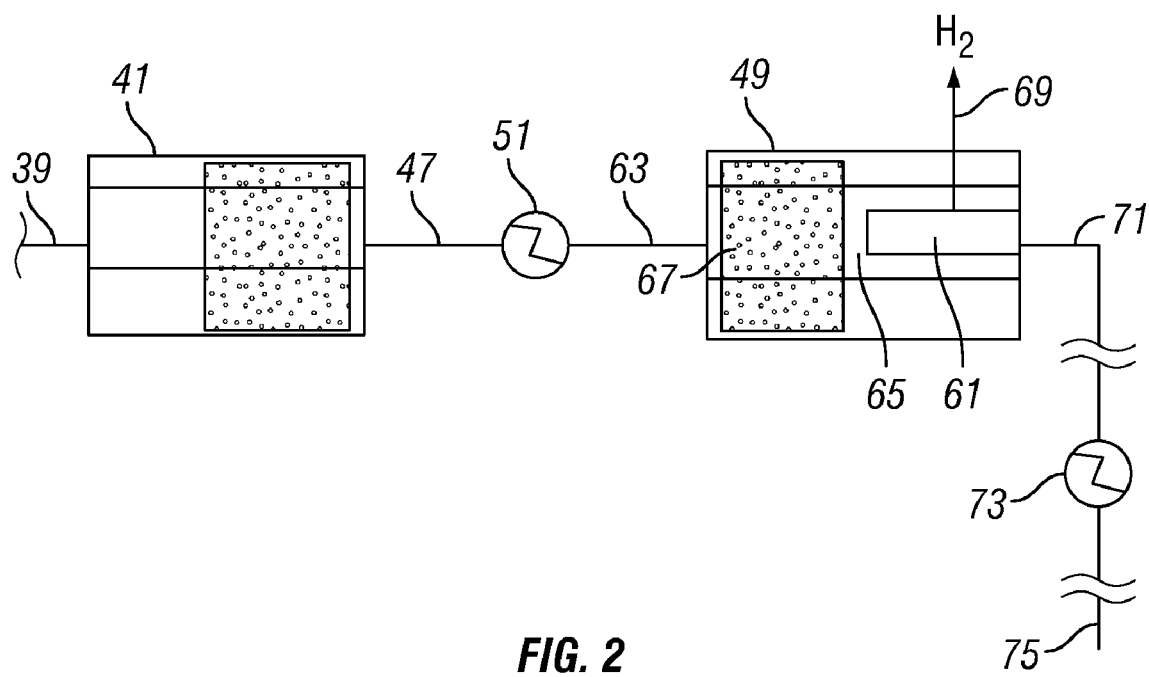
FIG. 2 is a schematic diagram of a portion of a system in accordance with the present invention.

Alternatively, as shown in FIG. 2, instead of having a separate hydrogen separation unit, one or more hydrogen-permeable hydrogen-selective membranes 61 may be located within water-gas shift reactor 41 or 49 to separate the first hydrogen gas stream from the first shift gas. Preferably, as shown in FIG. 2, each hydrogen-permeable hydrogen-selective membrane 61 is located within a second water-gas shift reactor 49 which is coupled in gas/fluid communication with the first water-gas shift reactor 41 through outlet 47, shift product heat exchanger 51, and the heat exchanger outlet 63. The second water-gas shift reactor 49 includes a flow path 65 in gas/fluid communication with the second shift reactor shift catalyst 67 and each membrane 61.

Each hydrogen-permeable hydrogen-selective membrane 61 has a hydrogen outlet 69 through which the first hydrogen gas stream may exit the membrane and the second water-gas shift reactor 49. Each membrane 61 is positioned in the shift reactor 49 to permit gas/fluid communication of hydrogen in the flow path 65 in the shift reactor 49 with the hydrogen outlet 69 through the membrane 61 and to inhibit the gas/fluid communication of a non-hydrogen gas with the hydrogen outlet 69.

The outlet 71 of the second shift reactor 49 containing one or more membranes 61 is a hydrogen-depleted gas outlet through which a hydrogen-depleted gas—derived by removal of hydrogen from the first shift gas by contact of the first shift gas with one or more membranes 61—may be removed from the second shift reactor 49.

The hydrogen-depleted gas outlet 71 of the second shift reactor 49, or, referring again to FIG. 1, the hydrogen-depleted gas outlet 59 of the hydrogen separation unit 55 is coupled in gas/fluid communication with the steam reforming reactor 23 through a second heat exchanger 73 and a second reforming reactor feed inlet 75. The second heat exchanger 73 is preferably a pre-reformer for heating the hydrogen-depleted gas to temperatures of at least 550° C. The hydrogen-depleted gas outlet 71 of the second shift reactor 49 or the hydrogen-depleted gas outlet 59 of the hydrogen separation unit 55 is coupled in gas/fluid communication with the second heat exchanger 73. The second heat exchanger 73 is coupled in gas/fluid communication with the second reforming reactor feed inlet 75 such that the hydrogen-depleted gas heated in the heat exchanger is fed to the second reforming reactor feed inlet 75.

The second reforming reactor feed inlet 75 provides an inlet into the steam reforming reactor 23 for the hydrogen-depleted gas, and is coupled in gas/fluid communication with a second flow path 77 through the reactor 23. The second flow path 77 is in gas/fluid communication with the reforming catalyst 31 and is in heat transfer communication with the heat source 25 so the hydrogen-depleted gas may be contacted with the catalyst 31 while being exposed to heat from the heat source 25 in order to effect a steam reforming reaction on the hydrogen-depleted gas. The second flow path is in gas/fluid communication with a second reforming reactor outlet 79 through which a second reformed gas may exit the reforming reactor 23. The second flow path 77 is separate and distinct from the first flow path 33 so that the hydrogen-depleted gas and second reformed gas flowing through the second flow path 77 are not mixed with the hydrocarbon/steam feed and first reformed gas flowing through the first flow path 33.

The second reforming reactor outlet is coupled in gas/fluid communication with a second heat exchanger 73 to cool the second reformed gas exiting the reforming reactor 23. In a preferred embodiment, the second reformed gas passes through the second heat exchanger 73 countercurrent to the hydrogen-depleted gas stream entering the second heat exchanger 73 from either the hydrogen-depleted gas outlet 71 of the second shift reactor 49 (see FIG. 2) or the hydrogen-depleted gas outlet 59 of the hydrogen separation unit 55 (see FIG. 1) so the second reformed gas exchanges heat with the hydrogen-depleted gas to cool the second reformed gas and to heat the hydrogen-depleted gas. Preferably, the second heat exchanger 73 may cool the second reformed gas to a temperature of from 200° C. to 500° C. and warm the hydrogen-depleted gas to a temperature of at least 550° C. by heat exchange between the second reformed gas and the hydrogen-depleted gas.

The second heat exchanger 73 is coupled in gas/fluid communication with a second-pass water gas shift reactor 81 through line 83. The cooled second reformed gas may exit the second heat exchanger 73 and pass into the second-pass water-gas shift reactor 81 through line 83. The second-pass water-gas shift reactor 81 may contain a water-gas shift catalyst 85 which is effective for catalyzing a water-gas shift reaction with the constituents of the cooled second reformed gas at a temperature of from 200° C. to 500° C. The water-gas shift catalyst 85 may be any catalyst effective for catalyzing a water-gas shift reaction. Preferred catalysts are described above with respect to the process of the present invention.

A shift reaction flow path 87 passes through the first-pass water-gas shift reactor 81 coupled in gas/fluid communication with line 83, the water-gas shift catalyst 85, and second-pass shift reactor outlet 89. Cooled second reformed gas may enter the second-pass water-gas shift reactor 81 through line 83, enter the shift reaction flow path 87, contact the water-gas shift catalyst 85, and exit the second-pass shift reactor 81 as a second shift gas.

Optionally, the system 10 may include one or more additional second-pass water-gas shift reactors, shown in FIG. 1 as a single reactor 91, which are coupled in gas/fluid communication with the second-pass water-gas shift reactor 81 through outlet 89. If more than one additional shift reactor 91 is utilized, the additional shift reactors may be arranged in series with the outlet of a preceding shift reactor coupled in gas/fluid communication with the inlet of the next shift reactor in the series. The one or more additional shift reactors 91 may include a water-gas shift reaction catalyst that may be any catalyst effective to catalyze a water-gas shift reaction, and preferably is the same type of catalyst as used in shift reactor 81.

Further, optionally, the first additional second-pass water-gas shift reactor 91 may be coupled in gas/fluid communication to the second-pass water-gas shift reactor 81 through a shift product heat exchanger 93 coupled in gas/fluid communication with outlet 89, and each additional shift reactor 91 in the series of shift reactors 91, if any, may be coupled in gas/fluid communication with the next shift reactor in the series through a shift product heat exchanger 93. A shift product exiting shift reactor 81 through outlet 89 may pass directly to shift reactor 91 for further shift reaction, or may pass through the shift heat exchanger 93 to cool the shift product and then pass the cooled shift product to shift reactor 91 for further shift reaction to form the second shift gas. Similarly, a shift reaction product exiting one of the additional second-pass shift reactors 91 may pass directly to the next shift reactor 91 in the series of additional shift reactors 91, if any, or may pass through a shift product heat exchanger 93 first.

The outlet 89 of the second-pass shift reactor 81, or outlet 95 if one or more additional second-pass water-gas shift reactors 91 are present, may be coupled in gas/fluid communication to a hydrogen/carbon dioxide separator 97. In an embodiment, the outlet 89 or outlet 95 may be coupled in gas/fluid communication with the hydrogen/carbon dioxide separator through heat exchanger 100, where heat exchanger 100 may cool the second shift gas to condense and separate steam from the second shift gas. The hydrogen/carbon dioxide separator 97 includes means for separating the second shift gas into a second hydrogen gas stream and a carbon dioxide stream. The hydrogen/carbon dioxide separator 97 includes a hydrogen gas outlet 99 and a carbon dioxide outlet 101. The second shift gas may enter the hydrogen/carbon dioxide separator 97 and a second hydrogen gas stream may be separated from the second shift gas and directed through the hydrogen gas outlet 99 while a carbon dioxide stream may be separated from the second shift gas and directed through the carbon dioxide outlet 101.

In one embodiment, the hydrogen/carbon dioxide separator 97 comprises one or more hydrogen-permeable hydrogen-selective membranes. Membranes effective for use in the hydrogen/carbon dioxide separator are described above with respect to the process of the present invention.

In another embodiment, the hydrogen/carbon dioxide separator 97 comprises one or more pressure swing adsorption vessels containing a porous material selective for adsorbing carbon dioxide and other non-hydrogen gases in the second shift gas. Porous materials selective for adsorbing non-hydrogen gases useful in a pressure swing adsorption vessel are described above with respect to the process of the present invention.

In yet another embodiment, the hydrogen/carbon dioxide separator 97 comprises a heat exchanger effective to refrigerate the second shift gas to a temperature at which carbon dioxide separates from the second shift gas.

Figure 3:
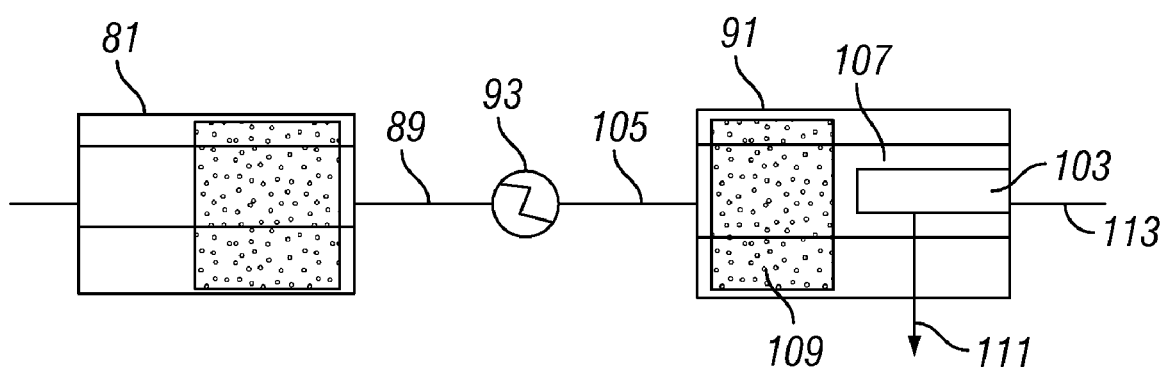
FIG. 3. is a schematic diagram of a portion of a system in accordance with the present invention.

Alternatively, as shown in FIG. 3, instead of having a separate hydrogen/carbon dioxide separator, one or more hydrogen-permeable hydrogen-selective membranes 103 may be located within water-gas shift reactor 81 or 91 to separate the second hydrogen gas stream from the second shift gas. Preferably, as shown in FIG. 3, each hydrogen-permeable hydrogen-selective membrane is located within a second water-gas shift reactor 91 which is coupled in gas/fluid communication with the first water-gas shift reactor 81 through outlet 89, the shift product heat exchanger 93, and the heat exchanger outlet 105. The second water-gas shift reactor 91 includes a flow path 107 in gas/fluid communication with the second shift reactor shift catalyst 109 and each membrane 103.

Each hydrogen-permeable hydrogen-selective membrane 103 has a hydrogen outlet 111 through which the second hydrogen gas stream may exit the membrane 103 and the second water gas shift reactor 91. Each membrane 103 is positioned in the shift reactor 91 to permit gas/fluid communication of hydrogen in the flow path 107 in the shift reactor 91 with the hydrogen outlet 111 through the membrane 103 and to inhibit the gas/fluid communication of carbon dioxide and other non-hydrogen gases in the second shift gas with the hydrogen outlet 111.

The outlet 113 of the second shift reactor 91 including one or more membranes 103 is a carbon dioxide outlet through which a carbon dioxide stream may be removed from the shift reactor 91.

Example 1

An ASPEN PLUS® computer simulation was run to demonstrate the effect of the process and system of the present invention on converting a gaseous hydrocarbon/steam feed to hydrogen and carbon dioxide. The process may be modeled by an ASPEN PLUS® computer simulation since the product stream content of the process streams can be accurately predicted based upon temperature, pressure (flow rates), thermodynamic equilibrium constants, and feed stream composition in the process.

The process simulation was run at a pressure of 3.04 MPa (30 atm) throughout. The molecular content profile of an initial feed stream for the simulation was based on a typical natural gas molecular profile. The content of methane, carbon dioxide, carbon monoxide, hydrogen, and steam of the process streams was determined in a process according to the present invention. Nitrogen and ethanol were present in insignificant amounts in the process streams, and, therefore, the nitrogen content and ethanol content was not tracked. Dry basis content of the process streams is shown in parenthesis.

A natural gas feed heated to 415° C. was fed to a prereformer. The natural gas feed had the following content in mol % on a wet basis (or mol. % on a dry basis): methane—22.4% (91.2%), carbon dioxide—0.1% (0.4%); carbon monoxide—0.0% (0.0%); hydrogen—0.4% (2%); and steam 75.4%. The natural gas feed was heated in the prereformer by heat exchange with a first reformed gas exiting a steam reformer to form a feed for the steam reformer having a feed content (mol %) of methane—18.4% (46.1%), carbon dioxide—4.2% (10.6%); carbon monoxide—0.4% (0.9%); hydrogen—16.7% (41.9%); and steam 60.1% at a temperature of 567° C. The increase in carbon dioxide, carbon monoxide, and hydrogen coupled with the decrease in methane and steam showed that some steam reforming and water gas shift reactions occurred in the prereformer.

The feed from the prereformer to the steam reformer was steam reformed over a reforming catalyst to produce a first reformed gas. The first reformed gas had a temperature of 850° C. The first reformed gas had the following content in mol % on a wet basis (or mol % on a dry basis): methane—4.3% (6.6%), carbon dioxide—5.7% (8.8%); carbon monoxide—8.2% (12.7%); hydrogen—46.5% (71.7%); and steam 35.1%. The first reformed gas was then cooled to a temperature of 391° C. by heat exchange with the natural gas feed in the prereformer and by additional cooling in an additional heat exchanger after being cooled in the prereformer.

The cooled first reformed gas was fed to a first shift reactor where the first reformed gas was water-gas shift reacted over a shift catalyst to produce a first shift gas. The first shift gas had a temperature of 450° C., as the reaction was slightly exothermic. The first shift gas had the following content in mol % on a wet basis (or mol % on a dry basis): methane—4.3% (6.0%), carbon dioxide—11.3% (16.0%); carbon monoxide—2.7% (3.8%); hydrogen—52.2% (74.0%); and steam 29.5%.

The first shift gas was then fed to a first hydrogen-permeable, hydrogen-selective membrane to separate hydrogen from the first shift gas. The temperature of the first shift gas contacted with the first hydrogen-permeable, hydrogen-selective membrane was 450° C. and the pressure of the first shift gas in contact with the membrane was 3.04 MPa (30 atm). A sweep gas of steam was used to sweep hydrogen gas permeating the membrane at 0.45 MPa (4.5 Atm) to increase the flux of hydrogen through the membrane. The membrane separator was also packed with water-gas shift catalyst on the retentate side to increase the carbon monoxide conversion to carbon dioxide, while the hydrogen is separated. The first hydrogen gas stream permeating through the membrane had a hydrogen content (mol %) of 100%. The hydrogen-depleted gas from which hydrogen was separated had the following content in mol % on a wet basis (or mol % on a dry basis): methane—9.1% (21.5%), carbon dioxide—29.6% (69.5%); carbon monoxide—0.2% (0.5%); hydrogen—0.4% (2%); and steam 75.4%. Of considerable interest, the methane content of the hydrogen-depleted gas was significant (21.5 mol % on a dry basis).

The hydrogen-depleted gas was then fed to a second heat exchanger/prereformer where the hydrogen-depleted gas was heated by heat exchange with a second reformed gas exiting the steam reformer to form a feed for the steam reformer having a feed content in mol % on a wet basis (mol %) of methane—7.5% (16.3%), carbon dioxide—29.0% (63.2%); carbon monoxide—1.3% (2.8%); hydrogen—7.8% (17.0%); and steam 54.1% at a temperature of 567° C. The heated hydrogen-depleted gas was then fed to the steam reformer for steam reforming over the reforming catalyst, where the feed stream of the heated hydrogen-depleted gas and its reformed product, the second reformed gas, were maintained separate from the natural gas feed stream and the first reformed gas in the steam reforming reactor.

The second reformed gas had a temperature of 850° C. and had a content in mol % on a wet basis (or mol % on a dry basis) of methane—0.4% (0.8%), carbon dioxide—21.6% (39.4%); carbon monoxide—11.2% (20.4%); hydrogen—21.3% (39.0%); and steam 45.2%. The second reformed gas was then cooled to a temperature of 373° C. by heat exchange in a second heat exchanger/prereformer with the hydrogen-depleted gas exiting the first hydrogen-permeable, hydrogen-selective membrane, and by additional cooling in an additional heat exchanger after being cooled in the prereformer.

The cooled second reformed gas was fed to a second shift reactor where the second reformed gas was water-gas shift reacted over a shift catalyst to produce a second shift gas. The second shift gas had a temperature of 450° C., as the reaction was slightly exothermic. The second shift gas had the following content in mol % on a wet basis (or mol % on a dry basis): methane—0.4% (0.7%), carbon dioxide—29.6% (47.1%); carbon monoxide—3.1% (5.0%); hydrogen—29.4% (46.8%); and steam 37.2%.

The second shift gas was then fed to a second hydrogen-permeable, hydrogen-selective membrane to separate a hydrogen stream and a carbon dioxide stream from the second shift gas. The temperature of the second shift gas contacted with the second hydrogen-permeable, hydrogen-selective membrane was 450° C. and the pressure of the second shift gas in contact with the membrane was 3.04 MPa (30 atm). A sweep gas of steam was used to sweep hydrogen gas permeating the membrane at 0.45 MPa (4.5 Atm) to increase the flux of hydrogen through the membrane. The membrane separator was also packed with water-gas shift catalyst on the retentate side to increase the carbon monoxide conversion to carbon dioxide, while the hydrogen is separated. The hydrogen gas stream permeating through the second hydrogen-permeable, hydrogen-selective membrane had a hydrogen content (mol %) of 100%. The carbon dioxide stream from which hydrogen was separated had the following content (mol %): methane—0.6% (1.2%), carbon dioxide—46.2% (90.6%); carbon monoxide—0.4% (0.8%); hydrogen—3.3% (6.5%); and steam 48.9%. The carbon dioxide stream was then passed through a series of heat exchangers to cool the carbon dioxide stream to a temperature of 25° C. and condense and separate steam from the carbon dioxide stream. The resulting carbon dioxide stream had the following content (mol %): methane—1.2%; carbon dioxide—90.6%; carbon monoxide—0.9%; and hydrogen—6.5%. The carbon dioxide stream contained substantially less methane (1.2 mol %) than the hydrogen-depleted gas (21.4 mol %) compared to the hydrogen-depleted gas stream produced after one reforming/shift/hydrogen separation sequence.

Table 1 and Table 2 are provided below to show the effects of each step on the content of the processed streams.

TABLE 1

Process stream content-wet basis

| | $CH_4$ (mol %) | $CO_2$ (mol %) | CO (mol %) | $H_2$ (mol %) | $H_2O$ (steam) (mol %) |
|---|---|---|---|---|---|
| Natural Gas Feed | 22.4 | 0.1 | 0 | 0.4 | 75.4 |
| 1st Prereformer | 18.4 | 4.2 | 0.4 | 16.7 | 60.1 |
| $1^{st}$ Steam Reformer Output ($1^{st}$ reformed gas) | 4.3 | 5.7 | 8.2 | 46.5 | 35.1 |
| $1^{st}$ shift reactor output ($1^{st}$ shift gas) | 4.3 | 11.3 | 2.7 | 52.2 | 29.5 |
| $1^{st}$ $H_2$ membrane | | | | | |
| $1^{st}$ $H_2$ gas stream | 0 | 0 | 0 | 100 | 0 |
| Hydrogen depleted gas | 9.1 | 29.6 | 0.2 | 3.3 | 57.4 |
| $2^{nd}$ Prereformer | 7.5 | 29.0 | 1.3 | 7.8 | 54.1 |
| $2^{nd}$ Steam reformed output ($2^{nd}$ reformer gas) | 0.4 | 21.6 | 11.2 | 21.3 | 45.2 |
| $2^{nd}$ shift reactor output ($2^{nd}$ shift gas) | 0.4 | 29.6 | 3.1 | 29.4 | 37.2 |
| $2^{nd}$ $H_2$ membrane | | | | | |
| $2^{nd}$ $H_2$ gas | 0 | 0 | 0 | 100 | 0 |
| $CO_2$ gas | 0.6 | 46.2 | 0.4 | 3.3 | 48.9 |

TABLE 2

Process stream content-dry basis

| | $CH_4$ (mol %) | $CO_2$ (mol %) | CO (mol %) | $H_2$ (mol %) |
|---|---|---|---|---|
| Natural Gas Feed | 91.2 | 0.4 | 0 | 2.0 |
| 1st Prereformer | 46.1 | 10.6 | 0.9 | 41.9 |
| $1^{st}$ Steam Reformer Output ($1^{st}$ reformed gas) | 6.6 | 8.8 | 12.7 | 71.7 |
| $1^{st}$ shift reactor output ($1^{st}$ shift gas) | 6.0 | 16.0 | 3.8 | 74.0 |
| $1^{st}$ $H_2$ membrane | | | | |
| $1^{st}$ $H_2$ gas stream | 0 | 0 | 0 | 100 |
| Hydrogen depleted gas | 21.5 | 69.5 | 2.8 | 7.8 |
| $2^{nd}$ Prereformer | 16.3 | 63.2 | 2.8 | 17.0 |
| $2^{nd}$ Steam reformed output ($2^{nd}$ reformed gas) | 0.8 | 39.4 | 20.4 | 39.0 |
| $2^{nd}$ shift reactor output ($2^{nd}$ shift gas) | 0.7 | 47.1 | 5.0 | 46.8 |
| $2^{nd}$ $H_2$ membrane | | | | |
| $2^{nd}$ $H_2$ gas | 0 | 0 | 0 | 100 |
| $CO_2$ gas | 1.2 | 90.6 | 0.8 | 6.5 |

Tables 1 and 2 show that the process of the invention produces one or more hydrogen streams of comprised substantially all of hydrogen and a carbon dioxide stream comprised mostly of carbon dioxide from a natural gas stream and steam, where the hydrocarbons (methane) in the natural gas stream are almost entirely converted to non-hydrocarbons such as hydrogen and carbon dioxide.

What is claimed is:

1. A process, comprising:
    (a) contacting steam, a hydrocarbon, and a reforming catalyst at a temperature of at least 550° C., said hydrocarbon being vaporizable at said temperature, to produce a first reformed gas containing hydrogen, carbon monoxide, steam and at least one vaporized hydrocarbon;
    (b) cooling the first reformed gas to a temperature of from 200° C. to 500° C.;
    (c) contacting the cooled first reformed gas with a water-gas shift catalyst to produce a first shift gas containing hydrogen, carbon dioxide, steam, and at least one vaporized hydrocarbon;
    (d) separating hydrogen from the first shift gas to produce a first hydrogen gas stream and a hydrogen-depleted gas containing carbon dioxide, steam, and at least 5 mol % on a dry basis of vaporized hydrocarbons;
    (e) contacting the hydrogen-depleted gas with a reforming catalyst at a temperature of at least 550° C. to produce a second reformed gas containing hydrogen, carbon monoxide, and steam;
    (f) cooling the second reformed gas to a temperature of from 200° C. to 500° C.;
    (g) contacting the cooled second reformed gas with a water-gas shift reaction catalyst to produce a second shift gas containing hydrogen and carbon dioxide;
    (h) separating the second shift gas into a second hydrogen gas stream and carbon dioxide stream.

2. The process of claim 1 wherein the hydrogen-depleted gas is contacted with a reforming catalyst at a temperature of at least 550° C. in the absence of any vaporized hydrocarbons other than hydrocarbons present in the hydrogen-depleted gas.

3. The process of claim 1 wherein the carbon dioxide stream contains at least 75 mol % carbon dioxide.

4. The process of claim 1 wherein the carbon dioxide stream contains at most 5 mol % hydrocarbons.

5. The process of claim 1 wherein the first and second hydrogen gas streams each contain at least 97 mol % hydrogen hydrogen respectively.

6. The process of claim 1 further comprising the step of combining the first and second hydrogen gas streams to form a hydrogen product stream.

7. The process of claim 1 wherein, prior to separating the first hydrogen gas stream from the first shift gas, the first shift gas is contacted with a water-gas shift catalyst at a temperature of at least 200° C. and below the temperature at which the first reformed gas is contacted with a water-gas shift catalyst.

8. The process of claim 1 wherein, prior to separating the second hydrogen gas stream and carbon dioxide from the second shift gas, the second shift gas is contacted with a water-gas shift catalyst at a temperature of at least 200° C. and below the temperature at which the second reformed gas is contacted with a water-gas shift catalyst.

9. The process of claim 1 further comprising the step of separating water from the second shift gas prior to separating the second shift gas into the second hydrogen gas stream and the carbon dioxide stream, where said second shift gas further comprises steam in addition to hydrogen and carbon dioxide, and said second shift gas is cooled to a temperature at which said steam condenses into water.

10. A process, comprising:
separating hydrogen from a gas containing at least 30 mol % hydrogen, at least 5 mol % carbon dioxide, a hydrocarbon, carbon monoxide, and steam to provide a first hydrogen gas stream and a hydrogen-depleted gas containing at least 5 mol % carbon dioxide, steam, a hydrocarbon, and carbon monoxide;
contacting the hydrogen-depleted gas with a reforming catalyst at a temperature of at least 550° C. to produce a reformed gas containing hydrogen, carbon monoxide, and steam;
cooling the reformed gas to a temperature of from 200° C. to 500° C.;
contacting the cooled reformed gas with a water-gas shift reaction catalyst to produce a shift gas containing hydrogen and carbon dioxide;
separating the shift gas into a second hydrogen gas stream and a carbon dioxide stream.

11. The process of claim 10 wherein the hydrogen-depleted gas is contacted with a reforming catalyst at a temperature of at least 550° C. in the absence of any vaporized hydrocarbons other than hydrocarbons present in the hydrogen-depleted gas.

12. The process of claim 10 wherein the carbon dioxide stream contains at least 75 mol % carbon dioxide.

13. The process of claim 10 wherein the carbon dioxide stream contains at most 5 mol % hydrocarbons.

14. The process of claim 10 wherein the hydrogen gas stream contains at least 97 mol % hydrogen hydrogen.

15. The process of claim 10 wherein, prior to separating the hydrogen gas stream and carbon dioxide from the shift gas, the shift gas is contacted with a water-gas shift catalyst at a temperature of at least 200° C. and below the temperature at which the reformed gas is contacted with a water-gas shift catalyst.

16. The process of claim 10 further comprising the step of separating water from the shift gas prior to separating the shift gas into the hydrogen gas stream and the carbon dioxide stream, where said shift gas further comprises steam in addition to hydrogen and carbon dioxide, and said shift gas is cooled to a temperature at which said steam condenses into water.

* * * * *